United States Patent
Bailey et al.

(10) Patent No.: US 7,399,083 B2
(45) Date of Patent: Jul. 15, 2008

(54) KALIEDOSCOPE FOR ATTACHING WITH A VIDEO MONITOR

(76) Inventors: Scott J Bailey, 3246 E. Irwin Ave., Mesa, AZ (US) 85204; Nicholas Christopher Cravotta, 21900 McCourtney Rd., Grass Valley, CA (US) 95949

( * ) Notice: Subject to any disclaimer, the term of this patent is extended or adjusted under 35 U.S.C. 154(b) by 0 days.

(21) Appl. No.: 11/728,870

(22) Filed: Mar. 26, 2007

(65) Prior Publication Data
US 2007/0223099 A1 Sep. 27, 2007

Related U.S. Application Data

(60) Provisional application No. 60/785,725, filed on Mar. 24, 2006.

(51) Int. Cl.
*G03B 21/14* (2006.01)
(52) U.S. Cl. .............................. 353/1; 359/616; 353/99
(58) Field of Classification Search ................... 353/1, 353/2; 359/616, 617
See application file for complete search history.

(56) References Cited

U.S. PATENT DOCUMENTS

| 3,661,439 A | * | 5/1972 | Burnside et al. ............... 353/1 |
| 4,077,706 A | * | 3/1978 | Yaeger ........................... 353/1 |
| 4,527,186 A | | 7/1985 | Acker |
| 4,725,135 A | | 2/1988 | Browning |
| 4,731,666 A | | 3/1988 | Csesznegi |
| 4,733,960 A | * | 3/1988 | Bennett ........................ 353/1 |
| 4,776,653 A | * | 10/1988 | Kaplan ...................... 359/616 |
| 5,094,525 A | | 3/1992 | Nelson, Jr. |
| 6,062,698 A | * | 5/2000 | Lykens ...................... 359/850 |
| 6,422,705 B1 | | 7/2002 | Leary |
| 2004/0032662 A1 | * | 2/2004 | Hattori et al. ............... 359/616 |

* cited by examiner

*Primary Examiner*—William C. Dowling
(74) *Attorney, Agent, or Firm*—Marcus Risso; Tope-McKay & Associates (57) ABSTRACT

Described is a kaleidoscope for attaching with a video monitor. The kaleidoscope includes a housing and a monitor holder. The housing includes an interior, a first end, and a second end. The first end has an image receiving hole for receiving light from a video monitor. The interior includes multiple light surfaces for receiving the light from the video monitor and projecting the light toward the second end. The second end includes a viewing hole to allow a user to view the projected light. Through the monitor holder, the housing can be attached with a hand held video monitor. When the video monitor is in operation, images from the video monitor are received through the first end and projected within the interior of the housing between the light surfaces to provide a kaleidoscopic effect of the images, which can be viewed through the viewing hole in the second end.

40 Claims, 12 Drawing Sheets

KALIEDOSCOPE FOR ATTACHING WITH A VIDEO MONITOR

PRIORITY CLAIM

The present invention is a non-provisional patent application, claiming the benefit of priority of U.S. Provisional Application No. 60/785,725, filed on Mar. 24, 2006, entitled, "Kaleidoscope for Attaching with a Video Monitor."

BACKGROUND OF THE INVENTION (1) Field of Invention

The present invention relates to a kaleidoscope and, more specifically, to a kaleidoscope for connecting with a video monitor for receiving an image from the video monitor and generating a kaleidoscopic effect of the image.

(2) Description of Related Art

Kaleidoscopes have long been known in the art. Traditional kaleidoscopes are hand held devices that have an open end and a viewing end. The open end typically includes multiple mirrors or reflecting surfaces that are perpendicular to a fixed surface to generate a kaleidoscopic image that can be viewed at the viewing end. In some cases, kaleidoscopes find movement by turning wheels of stained glass at the end of the scope. In other cases, beads or other movable objects are included in the kaleidoscope to enhance and/or provide an image for the kaleidoscope.

In another art, video monitors are often used to portray a variety of video images. For example, music videos are popular forms of video images in which visual media is presented to a user in conjunction with the audio media. As can be appreciated by one skilled in the art, there is in infinite number of forms visual media that can be portrayed as a video image.

Although kaleidoscopes exists, none heretofore devised have been configured to operate with a video image. Thus, a continuing need exists for a kaleidoscope that is capable of connecting with a video monitor for generating a kaleidoscopic effect of the image provided by the video monitor.

SUMMARY OF INVENTION

The present invention relates to a kaleidoscope. The kaleidoscope is formed to allow a user to attach the kaleidoscope to a video monitor to generate a kaleidoscopic effect. More specifically, the kaleidoscope includes a housing and a monitor holder. The housing includes an interior, a first end, and a second end. The first end has an image receiving hole for receiving light from a video monitor. The interior includes multiple light surfaces for receiving the light from the video monitor and projecting the light toward the second end. The second end includes a viewing hole to allow a user to view the projected light. When the video monitor is in operation, images from the video monitor are received through the first end and projected within the interior of the housing between the light surfaces to provide a kaleidoscopic effect of the images, which can be viewed through the viewing hole in the second end. Additionally, the monitor holder is formed to be attached with a handheld video monitor for attaching the housing with the hand held video monitor. Essentially, the monitor holder is a device that facilitates a connection between the housing and the video monitor.

In another aspect, the monitor holder has dimensions that are formed to allow the monitor holder to be affixed with a hand held video monitor.

In yet another aspect, the monitor holder has dimensions that are formed to allow the monitor holder to be affixed with an iPod™.

Furthermore, the monitor holder is formed as a container with a cavity therein. The cavity is formed to accommodate a hand held video monitor. The monitor holder further includes a monitor space such that when the hand held video monitor is positioned within the monitor holder, and when the housing is attached with the monitor holder, at least a portion of the video monitor is in an unobstructed alignment with the image receiving hole to allow the housing to receive the video images from the video monitor to provide the kaleidoscopic effect of the image.

The present invention further comprises a connection apparatus for connecting the monitor holder with the housing.

In yet another aspect, the present invention further comprises a camera system connected with the second end of the housing. The camera system includes a camera that is directed toward the image receiving hole such that the kaleidoscopic effect can be captured by the camera.

Furthermore, the connection apparatus is selected from a group consisting of a hinge system, a rotating-pin system, a fixed-pin system, a magnet system, and a slip-cover system.

In another aspect, the hinge system further comprises a hinge hingedly connecting the monitor holder to the housing to allow a user to selectively cover the video monitor and flip the housing up and away from the video monitor.

In yet another aspect, the rotating-pin system further comprises a pin connecting the monitor holder to the housing such that the housing is rotatable about the pin to allow a user to rotate the housing to and from the video monitor to selectively cover the video monitor and expose the video monitor without removing the video monitor from monitor holder.

The magnet system further comprises at least one magnet attached with the monitor holder and at least one corresponding magnet positioned proximate the first end such that the housing can be affixed with the monitor holder via the magnets.

Additionally, the fixed-pin system further comprises a plurality of projections and corresponding receptors positioned about the housing and the monitor holder to affix the housing with the monitor holder by attaching the projections with the corresponding receptors.

In another aspect, the slip-cover system further comprises a base attached with the housing. The base has a perimeter and the monitor holder includes a notch formed to correspond with the perimeter of the base, thereby allowing a user to position the perimeter of the base into the notch to affix the housing with the monitor holder.

In yet another aspect, the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

Additionally, the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

Furthermore, the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

Finally, as can be appreciated by one in the art, the present invention also comprises a method for forming and using the invention described herein. The method comprises a plurality of acts as appropriate for each of the items listed herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a kaleidoscope and, more particularly to a kaleidoscope for connecting with a video monitor for receiving an image from the video monitor and generating a kaleidoscopic effect of the image. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise, if used, have been used for convenience purposes only and are not intended to imply any particular fixed direction. Instead, they are used to reflect relative locations and/or directions between various portions of an object.

(1) Description

Figure 1:
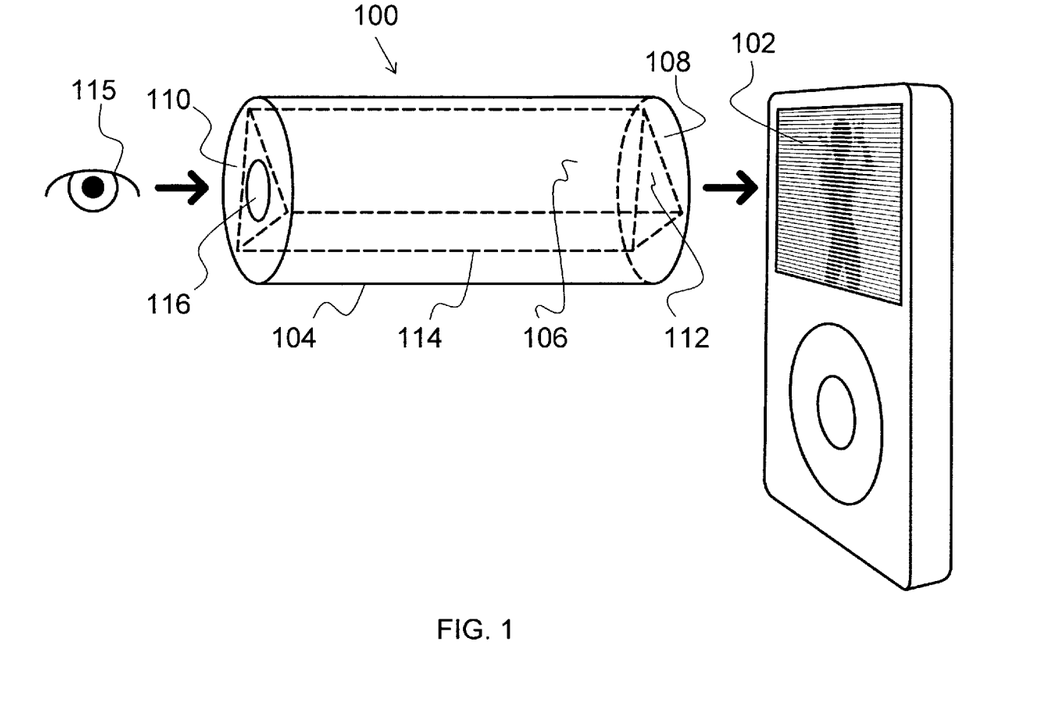
FIG. 1 is a perspective-view illustration of a kaleidoscope with a hand held video monitor according to the present invention.

As shown in FIG. 1, the present invention relates to a kaleidoscope 100 for attaching with a video monitor 102. In its most basic aspect, the kaleidoscope 100 includes a housing 104 and a monitor holder (illustrated as element 200 in FIG. 2). The housing 104 has an interior 106, a first end 108, and a second end 110. The first end 108 is configured to be positioned proximate a video monitor 102 to receive light (in the form of video images) from the video monitor 102. To facilitate this, the first end 108 has an image receiving hole 112 formed therein for receiving light from the video monitor 102.

In order to generate a kaleidoscopic effect, the interior 106 of the housing 104 has multiple light surfaces 114 contained therein for receiving the light from a video monitor 102 and projecting the light toward the second end 110. Additionally, to allow a user 115 to view the projected light (and thus the kaleidoscopic effect), the second end 110 has a viewing hole 116 formed therein.

As mentioned above, the kaleidoscopic affect is generated by multiple light surfaces 114. As used herein, the light surfaces 114 are any suitable surfaces for reflecting, refracting, and/or distorting light to produce a kaleidoscopic effect of a video image (such as moving pictures). Non-limiting examples of such light surfaces 114 include reflective surfaces (example given (e.g.), mirrors), refractive surfaces (e.g., prisms and/or lens), and distortive surfaces (e.g., mirrors, prisms, and/or lens). As can be appreciated by one skilled in the art, different light surfaces (e.g., mirror systems) generate different end results in a kaleidoscope. Thus, the light surfaces 114 can also include various refracting lenses (with or without kaleidoscopic mirrors) to connect with a video monitor to distort a video image and produce a desired result (i.e., altered image).

As illustrated, the light surfaces 114 are positioned within the housing 104 such that light passing into the housing will interact with and reflect between each of the light surfaces 114 to produce the kaleidoscopic effect. FIG. 1 illustrates three planar light surfaces (such as mirrors) that form a passage through which the light travels from the image receiving hole 112 to the viewing hole 116. As can be appreciated by one skilled in the art, although illustrated as three surfaces, the invention is not intended to be limited thereto as there are many configurations that can be used to produce a kaleidoscopic effect. For example, two, four, five, six, and any other suitable number of surfaces may be used, so long as they are facing each other (directly or indirectly) and reflect, refract, and or distort light toward each other and ultimately the viewing hole 116.

Figure 2:
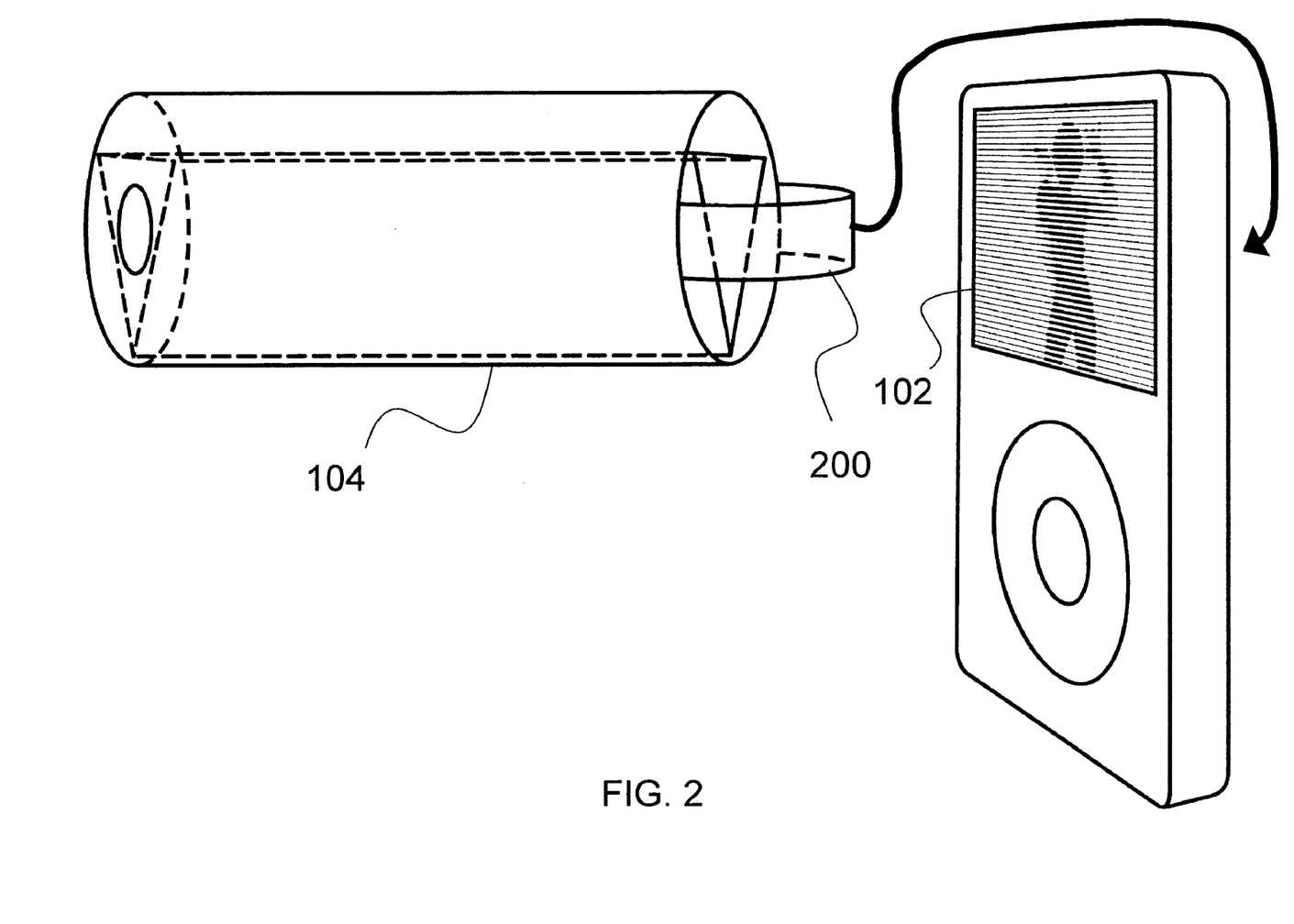
FIG. 2 is a perspective-view illustration of a kaleidoscope being attached with a hand held video monitor according to the present invention.

A unique aspect of the present invention is that it is formed to be attached with a video monitor. As shown in FIG. 2, the present invention includes a monitor holder 200 to enable the housing 104 to be attached with the video monitor 102. The monitor holder 200 is any suitable mechanism or device for connecting the housing 104 with a video monitor 102. As a non-limiting example and as illustrated in FIG. 2, the monitor holder 200 can be as simple as a strap (e.g., elastic strap) that can be stretched around and tightened against the video monitor 102, thereby affixing the housing 104 with the video monitor 102 to provide the kaleidoscopic effect.

As can be appreciated by one skilled in the art, the monitor holder 200 is formed to accommodate a video monitor 102 of any desirable size. For example, the monitor holder 200 is formed to be affixed with a hand held video monitor, such as Apples' iPod™. The iPod™ is created by Apple Inc., located at 1 Infinite Loop, Cupertino, Calif. 95014.

Figure 3:
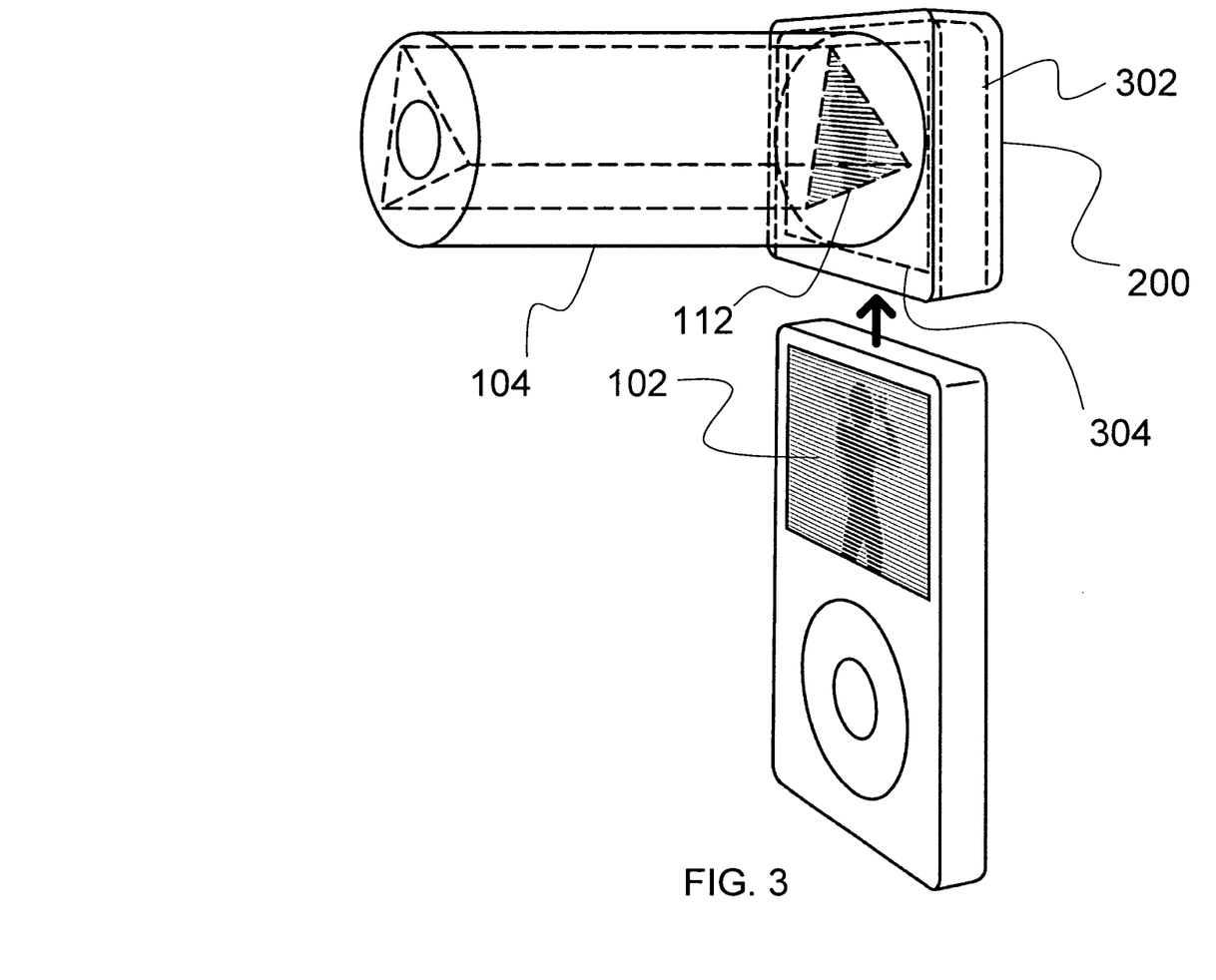
FIG. 3 is a perspective-view illustration of a kaleidoscope being attached with a hand held video monitor according to the present invention.

As another non-limiting example and as illustrated in FIG. 3, the monitor holder 200 is formed as a container with a cavity 302 therein. In this example, the cavity 302 is formed to be affixed with the hand held video monitor 102. The monitor holder 200 further includes a monitor space 304 that is formed to allow a user to view the video monitor 102 when the monitor holder 200 is affixed with the video monitor 102. Thus, the monitor space 304 is a cut-out that surrounds the actual video monitor 102 without obstructing it. More specifically, when the hand held video monitor 102 is positioned within the monitor holder 200, and when the housing 104 is attached with the monitor holder 200, at least a portion of the video monitor 102 is in an unobstructed alignment with the image receiving hole 112. Thus, the housing 104 is able to receive the video images from the video monitor 102 to provide the kaleidoscopic effect of the image.

Figure 4:
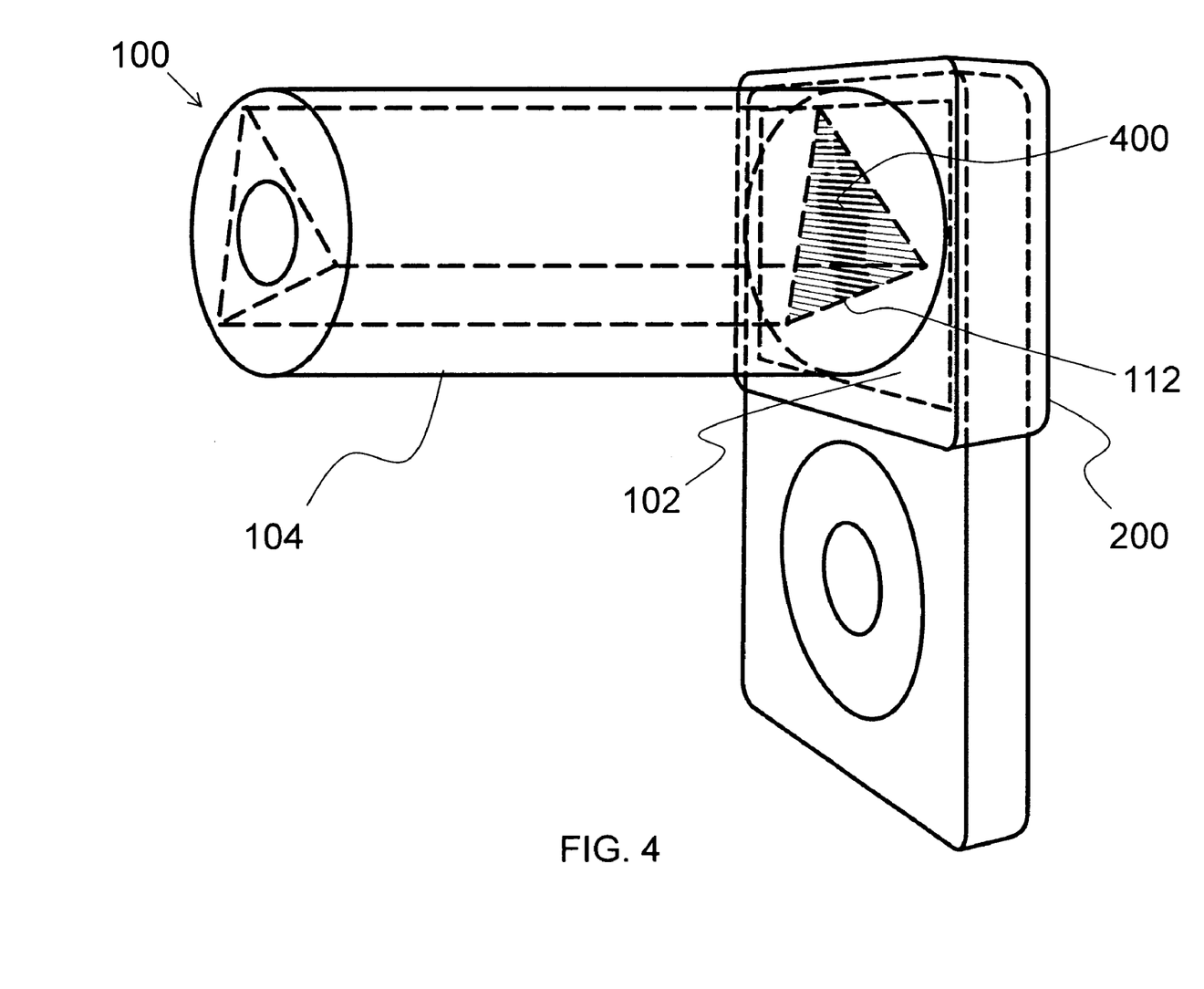
FIG. 4 is a perspective-view illustration of a kaleidoscope attached with a hand held video monitor according to the present invention.

FIG. 4 illustrates the monitor holder 200 as being wrapped around and affixed with the video monitor 102. Also shown is the housing 104 as attached with the monitor holder 200 and therefore the video monitor 102. Collectively, the monitor holder 200 and housing 104 form the kaleidoscope 100 of the present invention. As illustrated in FIG. 4, at least a portion 400 of the video monitor 102 is in an unobstructed alignment with the image receiving hole 112 to allow the housing 104 to receive the video images and produce the kaleidoscopic effect.

As shown in FIGS. 2 through 9C, the monitor holder 200 can be attached with the housing 104. As can be appreciated by one skilled in the art, there are numerous techniques by which the monitor holder 200 can be attached with the housing 104. For example, the monitor holder 200 can be fixedly attached with the housing 104, such as through integral formation and/or permanent attachment (e.g., the use of a glue).

As another example, the housing 104 can be movable (e.g., moved or removed) with respect to the monitor holder 200. FIGS. 5 through 9C illustrate a variety of such configurations. As shown in FIGS. 5 through 9, a connection apparatus is used for connecting the monitor holder 200 with the housing 104. The connection apparatus is any suitable mechanism or device for allowing a user to selectively affix the housing 104 with monitor holder 200 such that the viewing hole 112 is in alignment with the video monitor 102. Non-limiting examples of such a connection apparatus include a hinge system, a rotating-pin system, a fixed-pin system, a magnet system, and a slip-cover system. For further clarification, each of the examples listed above are described, in turn, below.

Figure 5:
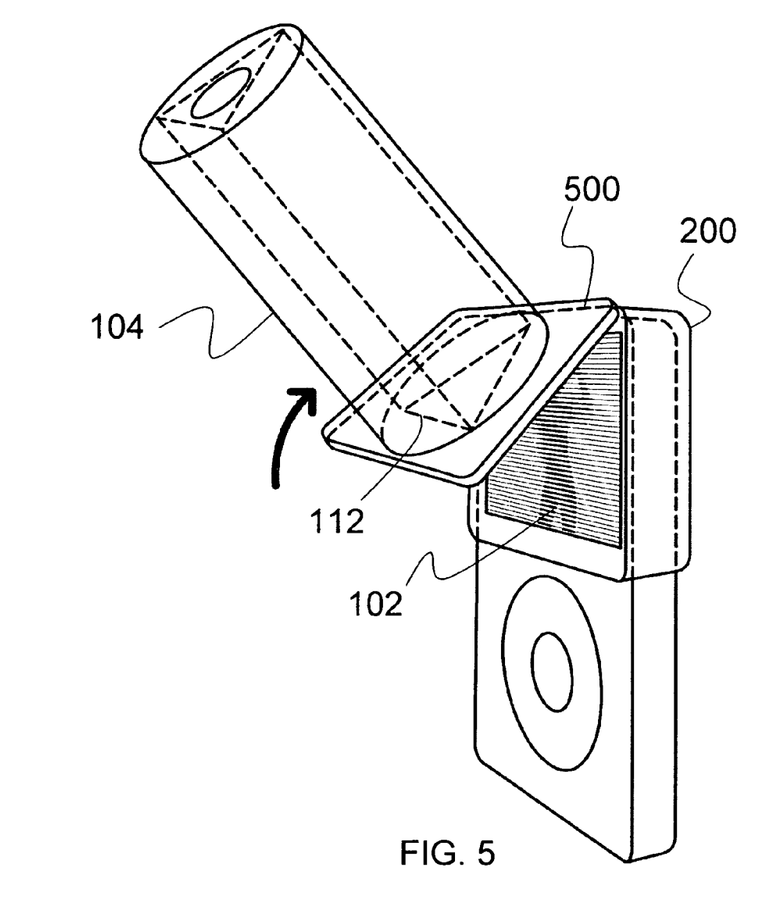
FIG. 5 is a perspective-view illustration of a kaleidoscope attached with a hand held video monitor according to the present invention.

As shown in FIG. 5, the connection apparatus is a hinge system. In this aspect, a hinge 500 is used to hingedly connect the monitor holder 200 to the housing 104. Thus, a user can selective cover the video monitor 102 by placing the housing 104 against the holder 200 or, alternatively, flip the housing 104 up and away from the video monitor 102. The hinge 500 is any suitable mechanism or device for hingedly connecting one object with another, non-limiting examples of which include adhesive bonding, integral formation, or a pin.

Figure 6:
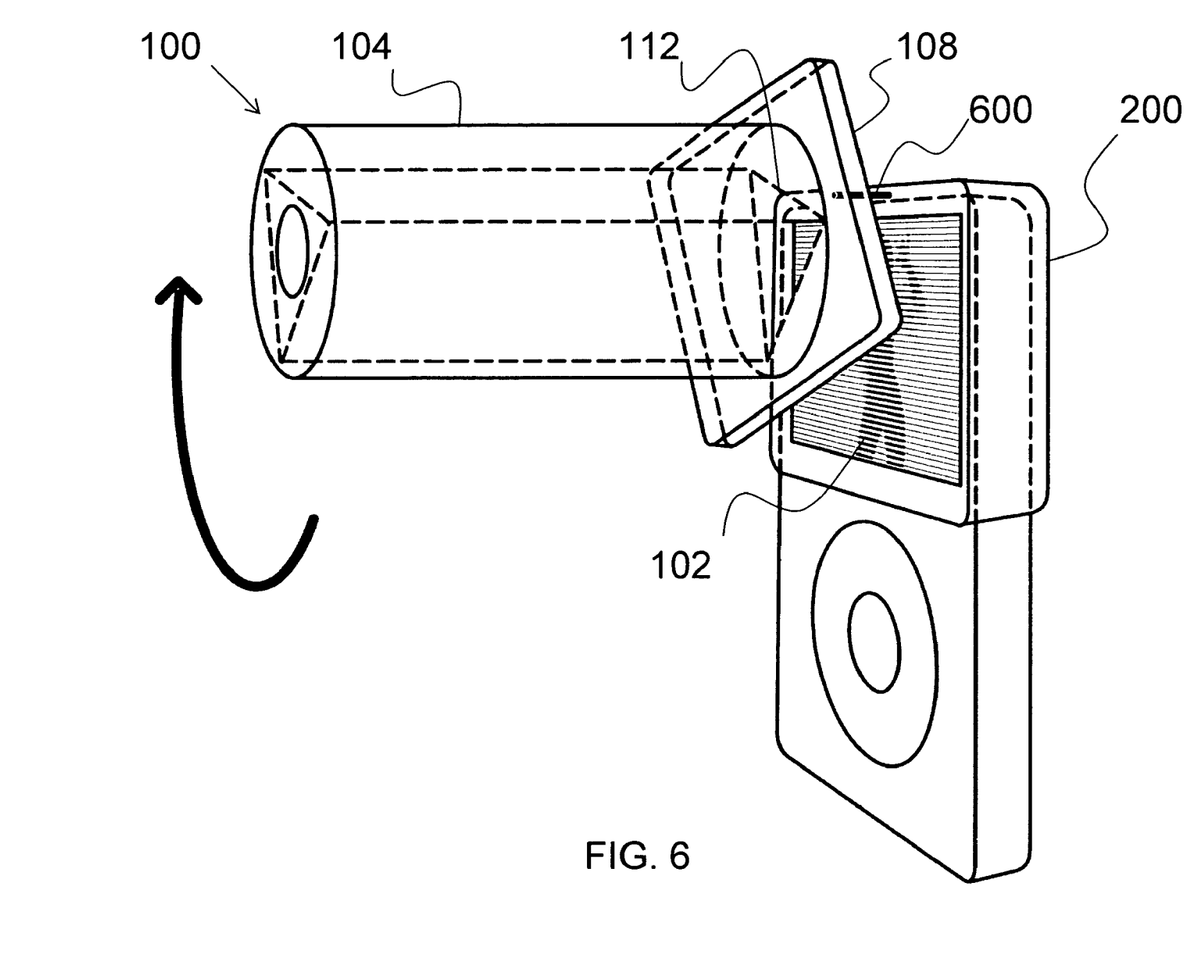
FIG. 6 is a perspective-view illustration of a kaleidoscope attached with a hand held video monitor according to the present invention.

FIG. 6 provides yet another non-limiting example of the connection apparatus. As shown in FIG. 6, the connection apparatus can be a rotating-pin system. In this aspect, the rotating-pin system includes a pin 600 that connects the monitor holder 200 to the housing 104. The pin 600 is affixed between the monitor holder 200 and the first end 108 of the housing to allow the housing 104 to rotate about the pin 600. Thus, a user can rotate the housing 104 to and from the video monitor 102 to selectively expose the video monitor 102 (or cover the video monitor 102) without removing the video monitor 102 from monitor holder 200.

Another unique aspect of the rotating-pin system is that it allows a user to shift the housing 104 to change the immediate view of the kaleidoscope 100. In other words, by rotating the housing 104 a small amount (e.g., even ⅛ of an inch), it alters the alignment of the image receiving hole 112 with the video monitor 102, which dramatically alters the kaleidoscopic effect.

Figure 7:
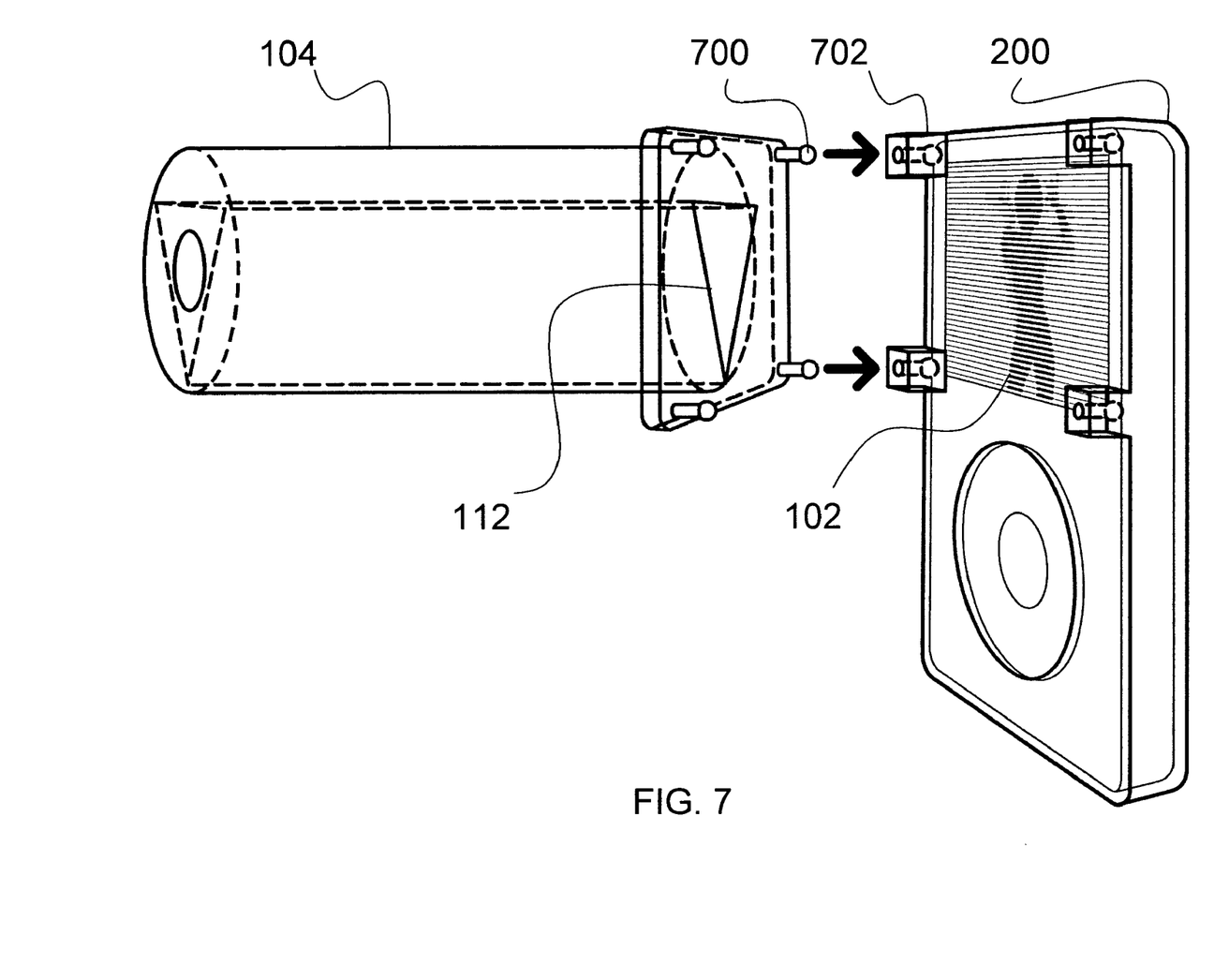
FIG. 7 is a perspective-view illustration of a kaleidoscope being attached with a hand held video monitor according to the present invention.

Another form of a pin system is illustrated in FIG. 7. In this aspect, the connection apparatus is a fixed-pin system that includes a plurality of projections 700 and corresponding receptors 702. The projections 700 and receptors 702 are positioned about the housing 104 and monitor holder 200 to allow a user to affix the housing 104 with the monitor holder 200 by attaching the projections 700 within the corresponding receptors 702. As can be appreciated by one skilled in the art, the projections 700 can be attached with the housing 104, while the receptors 702 are attached with the monitor holder 200 (or vice versa or any combination therebetween). Additionally, although one can imagine a variety of forms in which a projection 700 can attach with a receptor 702, a specific example includes male projections that fit into female receptors.

In another aspect, the projections 700 and receptors 702 can also be formed so that two of the connections are weaker and pop off easily, whereas the other two connections are stronger. In this aspect, the stronger connections can have gaps carved from the rubber which then act as hinges, such that when the two weak connections are broken, the housing 104 tips back, opening the space between it and the video monitor 102 so that a user can see the menu (such as that found on the iPod™).

Figure 8:
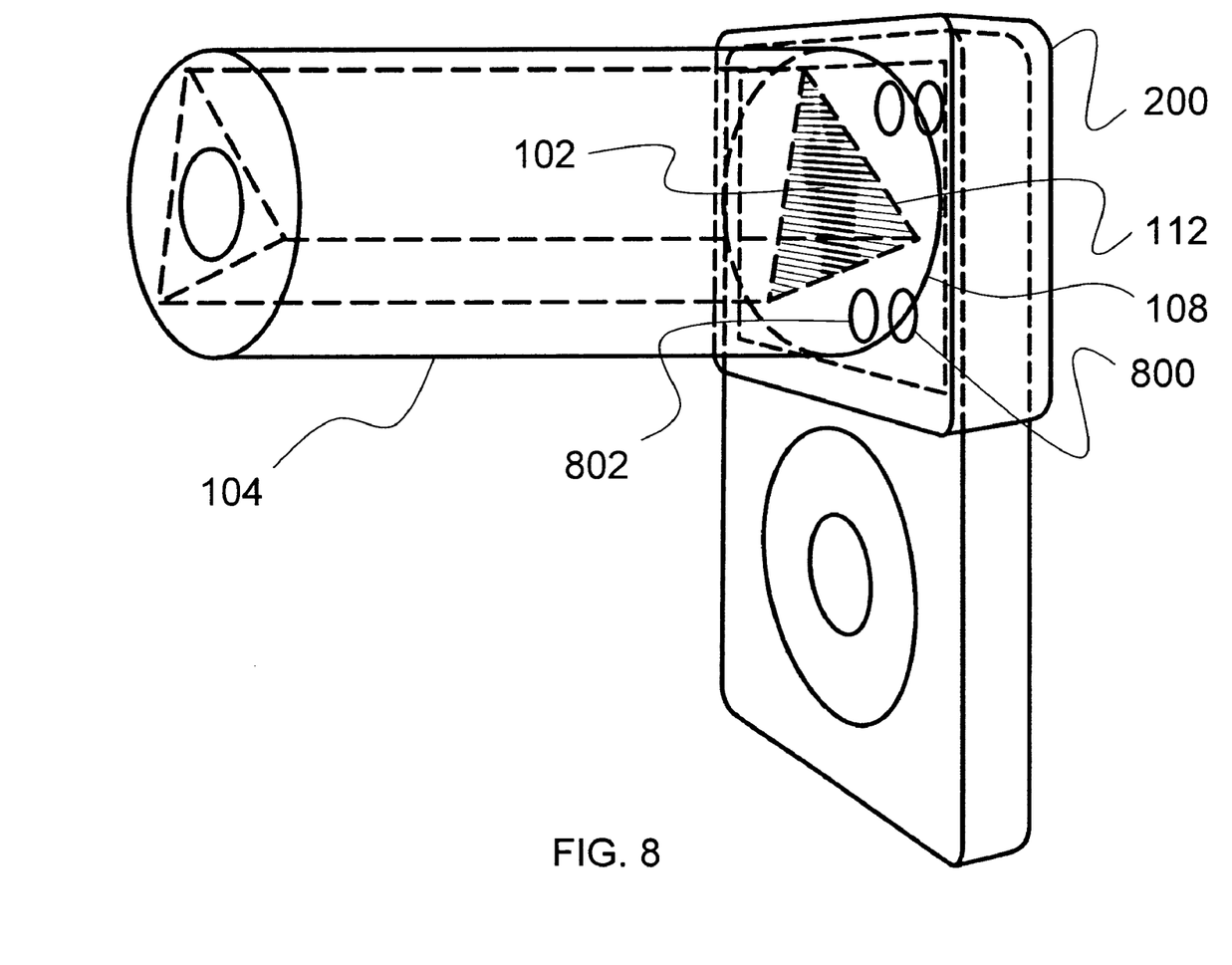
FIG. 8 is a perspective-view illustration of a kaleidoscope attached with a hand held video monitor according to the present invention.

As mentioned above, there are multiple techniques by which the connection apparatus can be used to attach the housing 104 to the monitor holder 200. Another example is illustrated in FIG. 8. In this example, the connection apparatus includes a magnet system. The magnet system includes at least one magnet 800 attached with the monitor holder 200 and at least one corresponding magnet 802 attached with the housing 104. The corresponding magnet 802 is positioned proximate the first end 108 and in a suitable location such that the magnets 800 and 802 engage with one another, thereby affixing the monitor holder 200 with the housing 104.

Figure 9A:
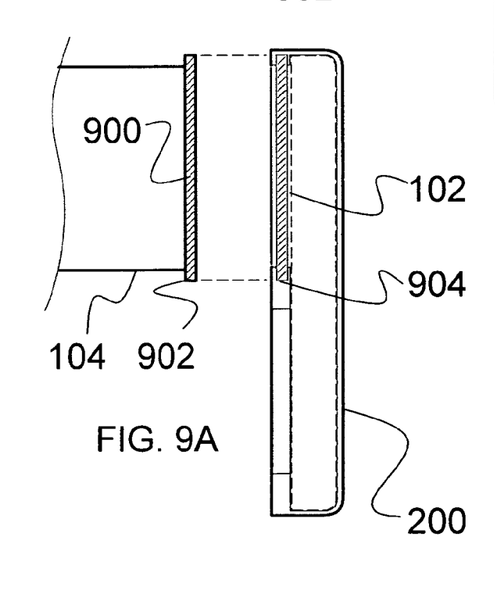
FIG. 9A is a cross-sectional, side-view illustration of a kaleidoscope being attached with a hand held video monitor according to the present invention.
Figure 9B:
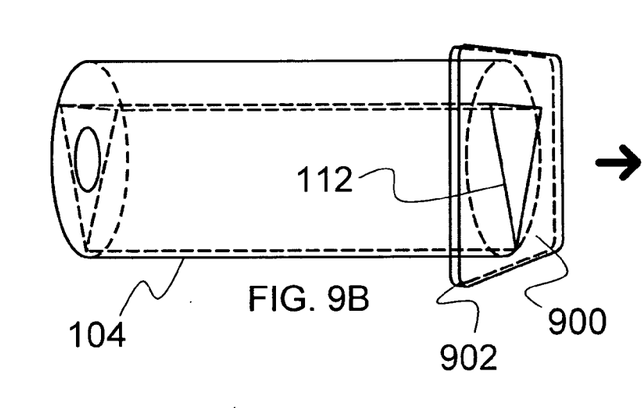
FIG. 9B is a perspective-view illustration of a housing according to the present invention.
Figure 9C:
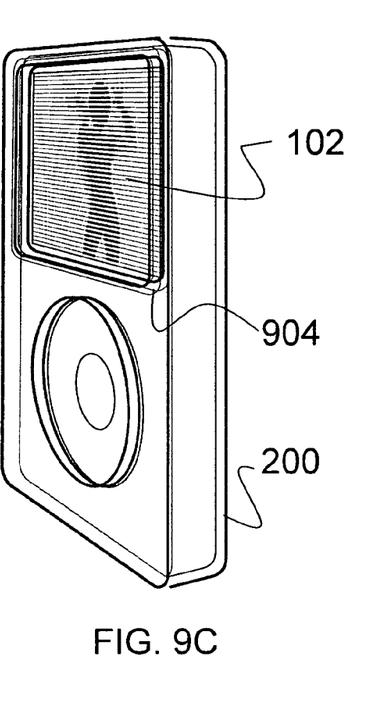
FIG. 9C is a perspective-view illustration of a monitor holder attached with a hand held video monitor according to the present invention.

FIGS. 9A through 9C illustrate yet another example of the connection apparatus. In this example, the connection apparatus is a slip-cover system. As shown in FIG. 9A, the slip-cover system includes a base 900 that is attached with the housing 104. The base 900 includes a perimeter 902 for attaching with the monitor holder 200. To facilitate such an attachment, the monitor holder 200 includes a notch 904 that is formed to correspond to the perimeter 902. In other words, a user can slip the perimeter 902 into the notch 904 to affix the housing 104 with the monitor holder 200. For further illustration, FIGS. 9B and 9C illustrate the housing 104 and monitor holder 200, respectively. As shown in FIGS. 9B and 9C, the perimeter 902 extends beyond the housing 104 to enable a user to easily affix it within the notch 904 of the monitor holder 200.

As illustrated throughout FIGS. 1 through 9C, the housing 104 and the video monitor 102 essentially become one when attached with one another. Thus, a user can either pick up the hand held video monitor 102 and hold the combined device to the user's face, or the user can hold the housing 104 itself to view the image.

As an added benefit, the monitor holder 200 operates as a cover for the hand held video monitor 102 when the housing 104 is disengaged from the monitor holder 200. As can be appreciated by one skilled in the art, the monitor holder 200 is formed of any suitable material for holding and protecting a video monitor, a non-limiting example of which includes rubber. In this aspect, the monitor holder 200 becomes a permanent case for the device, with its corners (e.g., rubber corners) protecting it from scratches and damage from falling, etc.

As described above, the present invention can be formed to be connected with a video monitor. As can be appreciated by one skilled in the art, the video monitor is any mechanism or device for displaying an image, light, and/or color. As a non-limiting example, it can include light emitting diodes (LED), liquid crystal displays (LCD), and/or other display devices (e.g., rear-screen projection screens, television monitors, etc.). The movement in the video itself provides the visuals and it can do so with a built-in soundtrack. It works with music videos, TV commercials, user initiated video/sound clips, and will also work with iTunes™ visualizers (such as programs which interpret sound as abstract visuals). iTunes™ is also produced Apple Inc.

Additionally, the kaleidoscope 100 can be formed to fit with video monitors of a variety of sizes. For example, the monitor holder 200 and housing 104 are formed to attached with a hand held video monitor 102, such as the video iPod™ (or any other similarly-sized hand held video monitor). Thus, images from the video monitor replace the wheels of stained glass (or beads) typically found in a kaleidoscope. In this aspect, the monitor holder 200 is formed to have any suitable dimension for attaching with a hand held video monitor, a non-limiting example of which includes a length of between approximately ½ an inch to 7 inches, with a width of approximately ½ an inch to 5 inches, and a depth of approximately 1/16 of an inch to 5 inches. More particularly, the monitor holder 200 is formed to hold video monitors with a length of between approximately 3.9 inches to 4.3 inches, with a width of approximately 2.2 inches to 2.6 inches, and a depth of approximately 0.3 inches to 0.6 inches.

In another aspect (not illustrated), the video monitor 102, the housing 104, and the monitor holder 200 are all interconnected as a single unit. Thus, as can be appreciated by one skilled, a user can load or display a video image onto the video monitor for viewing by the user. In this aspect, the three items can be separately formed and attached to form the single unit, or they can be integrally formed as a single unit. In either case, as can be appreciated by one skilled in the art, such a single unit would alleviate the need for a user to buy a separate video monitor and kaleidoscope, thereby adding commercial value to such an integrated unit.

Figure 10:
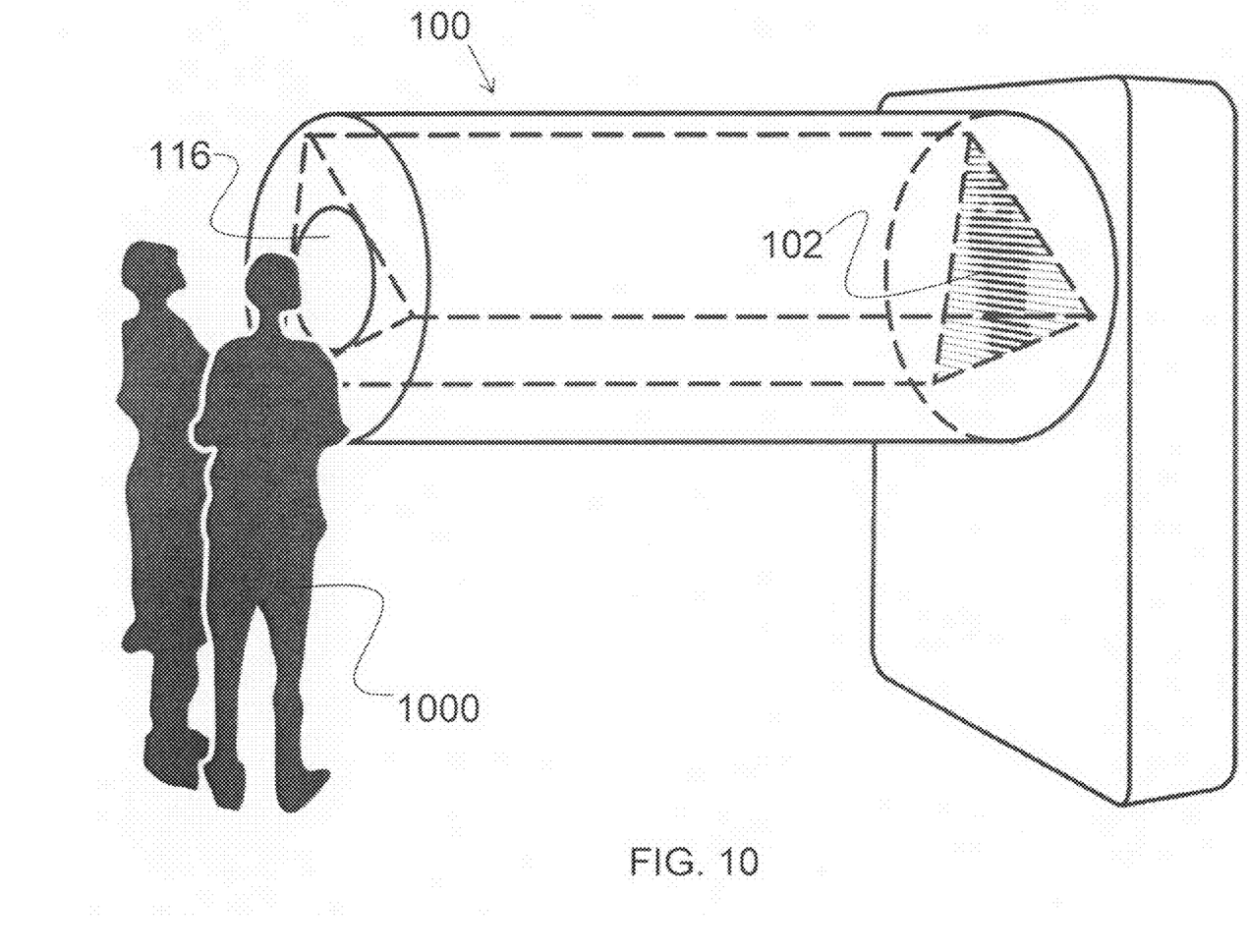
FIG. 10 is a perspective-view illustration of a kaleidoscope attached with a video monitor according to the present invention.

As another non-limiting example and as shown in FIG. 10, the kaleidoscope 100 can be attached with larger video monitors 102, such as those found in amusement parks. In such a larger scale system, the viewing hole 116 is a large opening that allows multiple people 1000 to view the altered image (e.g., kaleidoscopic images) generated by the attached kaleidoscope 100. In this aspect, and as a non-limiting example, a large triangle can provide the viewing hole 116 to allow multiple people 1000 to view the altered image. In another non-limiting example (not illustrated), multiple eye openings can be included to allow multiple people to view the altered image through the multiple eye openings.

Figure 11:
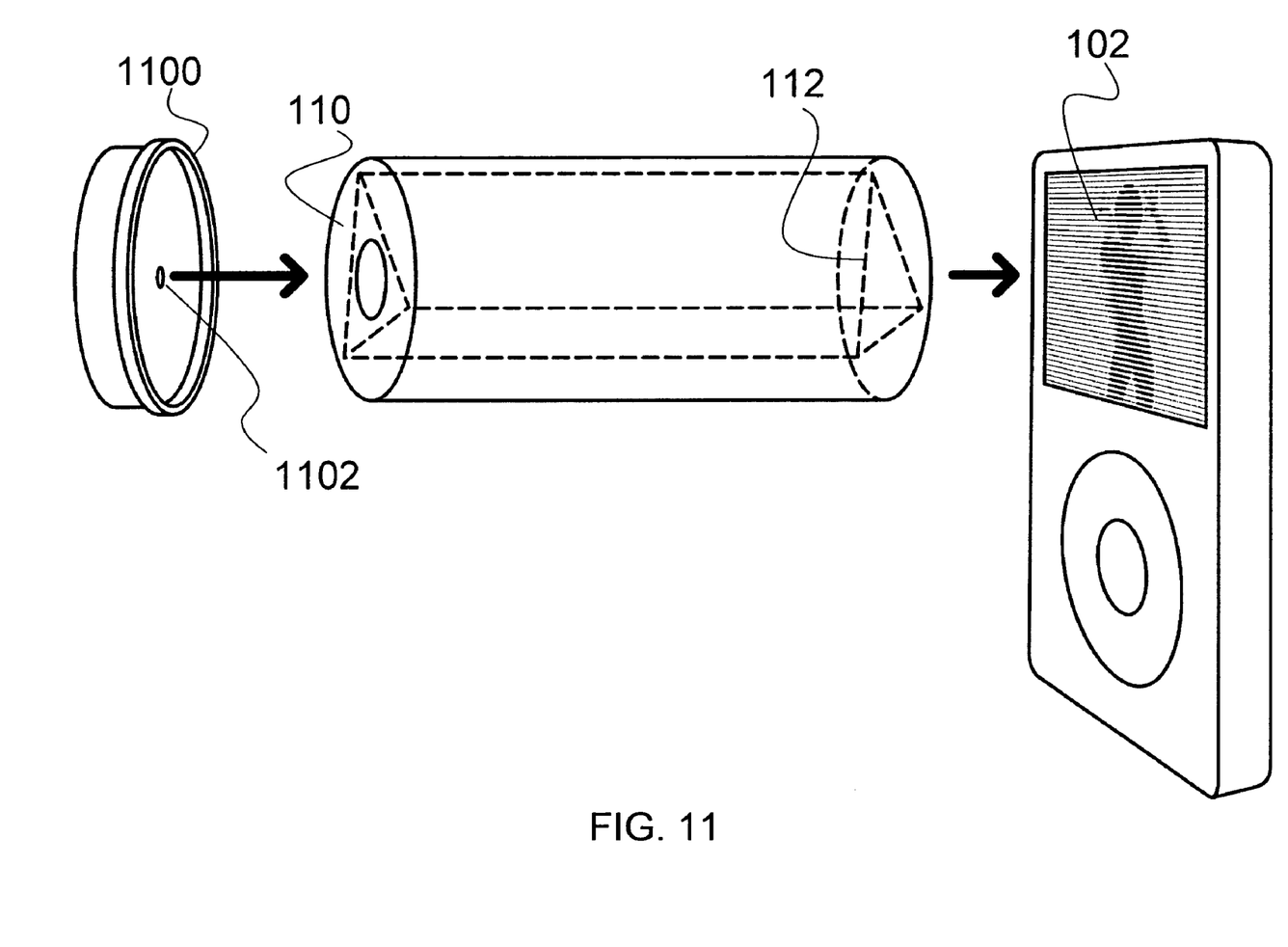
FIG. 11 is a perspective-view illustration of a kaleidoscope with a camera system according to the present invention.

In order to capture the kaleidoscopic effect and view it remotely, the present invention also includes a camera system. As shown in FIG. 11, the camera system 1100 can be attached with the second end 110 of the housing 104. The camera system 1100 includes a camera 1102 that is directed toward the image receiving hole 112 so that the kaleidoscopic effect can be captured by the camera 1102. In order to view the image, the camera system 1100 (and its camera 1102) can be connected with an external monitor. For example, the camera system 1100 includes a wireless transmitter for transmitting the altered image to a receiver. In this aspect, the receiver would be connected with an external monitor (e.g., television and computer) that can be used to display the altered video image. As another example, the camera system 1100 can be hard wired to an external monitor using any suitable wiring mechanism. For example, the camera system 1100 can include a cable (USB, HDMI, RCA, etc.) to allow a user to plug the kaleidoscope directly into the user's computer, television, etc.

Figure 12:
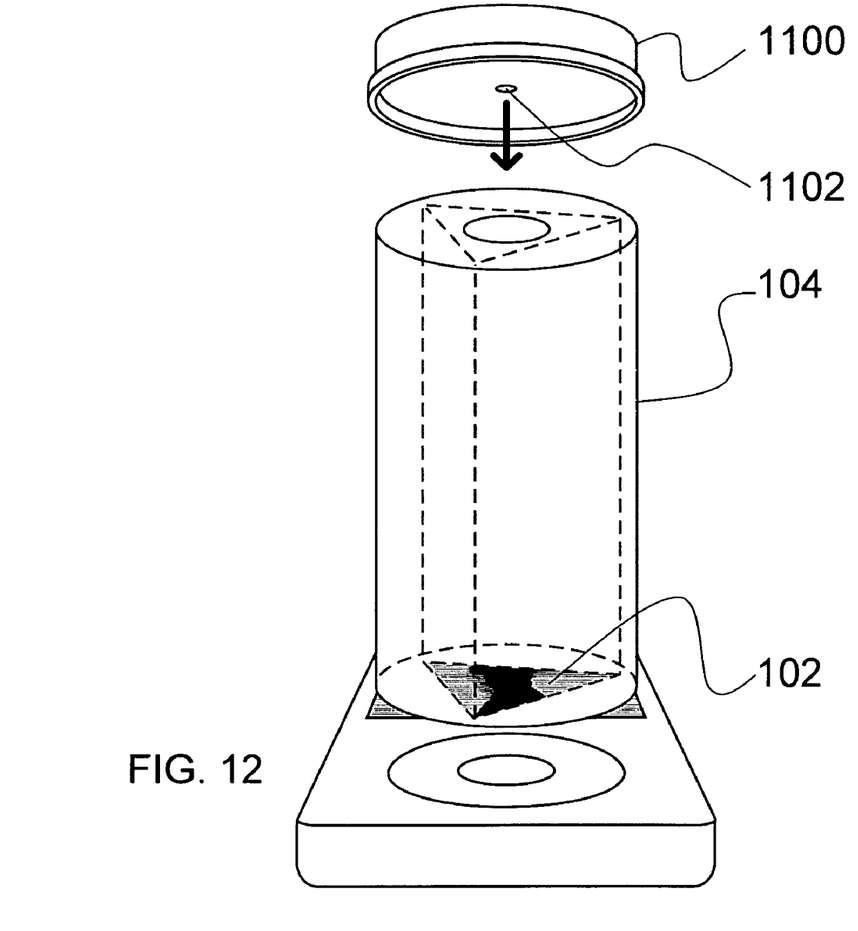
FIG. 12 is a perspective-view illustration of a kaleidoscope with a camera system according to the present invention.

FIG. 12 further illustrates the use of the camera system 1100. As shown, the housing 104 can be positioned over the video monitor 102, with the camera 1102 also being directed toward the video monitor 102. Thus, using the camera system 1102, a user can remotely view the altered image while enjoying the music (or other audio media) that is being played through the hand held video monitor 102.

In summary, the present invention relates to a kaleidoscope that operates with a video monitor. The kaleidoscope includes a housing which generates a kaleidoscopic effect. The present invention also includes a monitor holder to attach the housing to a video monitor (such as a hand held video monitor). The housing combined with the video monitor provides an altered image and/or kaleidoscopic effect of the image displayed on the video monitor. Additionally, in order to view the altered image and/or kaleidoscopic effect remotely, the present invention also includes a camera system. The camera system is attached with the housing and directed toward the video monitor to capture and transmit the images to an external monitor.

What is claimed is:

1. A kaleidoscope, comprising:

a housing having an interior, a first end, and a second end, the first end having an image receiving hole formed therein for receiving light from a video monitor, the interior having multiple light surfaces contained therein for receiving the light from a video monitor and projecting the light toward the second end, the second end having a viewing hole formed therein to allow a user to view the projected light, the housing being further configured to be attached with a video monitor, such that when the video monitor is in operation, images from the video monitor are received through the first end and projected within the interior of the housing between the light surfaces to provide a kaleidoscopic effect of the images, which can be viewed through the viewing hole in the second end.

2. A kaleidoscope as set forth in claim 1, further comprising a monitor holder formed to be attached with a handheld video monitor for attaching the housing with the hand held video monitor.

3. A kaleidoscope as set forth in claim 2, wherein the monitor holder has dimensions that are formed to allow the monitor holder to be affixed with a hand held video monitor.

4. A kaleidoscope as set forth in claim 3, wherein the monitor holder has dimensions that are formed to allow the monitor holder to be affixed with an iPod™.

5. A kaleidoscope as set forth in claim 4, wherein the monitor holder is formed as a container with a cavity therein, the cavity being formed to accommodate a hand held video monitor, and wherein the monitor holder further includes a monitor space such that when the hand held video monitor is positioned within the monitor holder, and when the housing is attached with the monitor holder, at least a portion of the video monitor is in an unobstructed alignment with the image receiving hole to allow the housing to receive the video images from the video monitor to provide the kaleidoscopic effect of the image.

6. A kaleidoscope as set forth in claim 5, further comprising a connection apparatus for connecting the monitor holder with the housing.

7. A kaleidoscope as set forth in claim 6, further comprising a camera system connected with the second end of the housing, the camera system having a camera directed toward the image receiving hole such that the kaleidoscopic effect can be captured by the camera.

8. A kaleidoscope as set forth in claim 7, wherein the connection apparatus is selected from a group consisting of a hinge system, a rotating-pin system, a fixed-pin system, a magnet system, and a slip-cover system.

9. A kaleidoscope as set forth in claim 8, wherein the hinge system further comprises a hinge hingedly connecting the monitor holder to the housing to allow a user to selectively cover the video monitor and flip the housing up and away from the video monitor.

10. A kaleidoscope as set forth in claim 9, wherein the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

11. A kaleidoscope as set forth in claim 9, wherein the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

12. A kaleidoscope as set forth in claim 9, wherein the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

13. A kaleidoscope as set forth in claim 8, wherein the rotating-pin system further comprises a pin connecting the monitor holder to the housing, such that the housing is rotatable about the pin to allow a user to rotate the housing to and from the video monitor to selectively cover the video monitor and expose the video monitor without removing the video monitor from monitor holder.

14. A kaleidoscope as set forth in claim 13, wherein the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

15. A kaleidoscope as set forth in claim 13, wherein the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

16. A kaleidoscope as set forth in claim 13, wherein the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

17. A kaleidoscope as set forth in claim 8, wherein the magnet system further comprises at least one magnet attached with the monitor holder and at least one corresponding magnet positioned proximate the first end such that the housing can be affixed with the monitor holder via the magnets.

18. A kaleidoscope as set forth in claim 17, wherein the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

19. A kaleidoscope as set forth in claim 17, wherein the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

20. A kaleidoscope as set forth in claim 17, wherein the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

21. A kaleidoscope as set forth in claim 8, wherein the fixed-pin system further comprises a plurality of projections and corresponding receptors positioned about the housing and the monitor holder to affix the housing with the monitor holder by attaching the projections with the corresponding receptors.

22. A kaleidoscope as set forth in claim 21, wherein the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

23. A kaleidoscope as set forth in claim 21, wherein the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

24. A kaleidoscope as set forth in claim 21, wherein the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

25. A kaleidoscope as set forth in claim 8, wherein the slip-cover system further comprises a base attached with the housing, the base having a perimeter, and wherein the monitor holder includes a notch formed to correspond with the perimeter of the base, thereby allowing a user to position the perimeter of the base into the notch to affix the housing with the monitor holder.

26. A kaleidoscope as set forth in claim 25, wherein the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

27. A kaleidoscope as set forth in claim 25, wherein the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

28. A kaleidoscope as set forth in claim 25, wherein the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

29. A kaleidoscope as set forth in claim 2, further comprising a connection apparatus for connecting the monitor holder with the housing.

30. A kaleidoscope as set forth in claim 29, wherein the connection apparatus is selected from a group consisting of a hinge system, a rotating-pin system, a fixed-pin system, a magnet system, and a slip-cover system.

31. A kaleidoscope as set forth in claim 2, wherein the monitor holder is formed as an elastic strap that is connected with the housing, the elastic strap being operable to slip over and hold the hand held video monitor proximate the image receiving hole of the housing.

32. A kaleidoscope as set forth in claim 2, wherein the monitor holder has dimensions that are formed to allow the monitor holder to be affixed with a hand held video monitor.

33. A kaleidoscope as set forth in claim 2, wherein the monitor holder has dimensions that are formed to allow the monitor holder to be affixed with an iPod™.

34. A kaleidoscope as set forth in claim 2, wherein the monitor holder is formed as a container with a cavity therein, the cavity being formed to accommodate a hand held video monitor, and wherein the monitor holder further includes a monitor space such that when the hand held video monitor is positioned within the monitor holder, and when the housing is attached with the monitor holder, at least a portion of the video monitor is in an unobstructed alignment with the image receiving hole to allow the housing to receive the video images from the video monitor to provide the kaleidoscopic effect of the image.

35. A kaleidoscope as set forth in claim 1, further comprising a camera system connected with the second end of the housing, the camera system having a camera directed toward the image receiving hole such that the kaleidoscopic effect can be captured by the camera.

36. A kaleidoscope as set forth in claim 1, wherein the multiple light surfaces are reflective surfaces that are formed to reflect light, such that when the video monitor is in operation, images from the video monitor are received through the first end and projected within the interior of the housing between the reflective surfaces to provide a kaleidoscopic effect of the images.

37. A kaleidoscope as set forth in claim 1, wherein the multiple light surfaces are refractive surfaces that are formed to refract light, such that when the video monitor is in operation, images from the video monitor are received through the first end and refracted within the interior of the housing between the refractive surfaces to provide a kaleidoscopic effect of the images.

38. A kaleidoscope as set forth in claim 1, wherein the multiple light surfaces are distortive surfaces that are formed to distort light, such that when the video monitor is in operation, images from the video monitor are received through the first end and distorted within the interior of the housing between the distortive surfaces to provide a kaleidoscopic effect of the images.

39. A kaleidoscope, comprising:
a housing having an interior, a first end, and a second end, the first end having an image receiving hole formed therein for receiving light from a video monitor, the interior having multiple reflective surfaces contained therein for receiving the light from a video monitor and reflecting the light toward the second end, the second end having a viewing hole formed therein to allow a user to view the reflected light, the housing being further configured to be attached with a video monitor, such that when the video monitor is in operation, images from the video monitor are received through the first end and reflected within the interior of the housing between the reflective surfaces to provide a kaleidoscopic effect of the images, which can be viewed through the viewing hole in the second end;
a monitor holder formed to be attached with a handheld video monitor for attaching the housing with the hand held video monitor, wherein the monitor holder has dimensions that are formed to allow the monitor holder to be affixed with an iPod™, and wherein the monitor holder is formed as a container with a cavity therein, the cavity being formed to accommodate a hand held video monitor, and wherein the monitor holder further includes a monitor space such that when the hand held video monitor is positioned within the monitor holder, and when the housing is attached with the monitor holder, at least a portion of the video monitor is in an unobstructed alignment with the image receiving hole to allow the housing to receive the video images from the video monitor to provide the kaleidoscopic effect of the image; and a camera system connected with the second end of the housing, the camera system having a camera directed toward the image receiving hole such that the kaleidoscopic effect can be captured by the camera.

40. A method for altering an image generated from a video monitor, comprising an act of:

attaching a monitor holder to a hand held video monitor, the monitor holder having a housing attached thereto and being formed as a container with a cavity therein, the cavity being formed to accommodate the hand held video monitor, the housing having an interior, a first end, and a second end, the first end having an image receiving hole formed therein for receiving light from the attached video monitor, the interior having multiple reflective surfaces contained therein for receiving the light from a video monitor and reflecting the light toward the second end, the second end having a viewing hole formed therein to allow a user to view the reflected light, and wherein the monitor holder further includes a monitor space such that when the hand held video monitor is attached with the monitor holder, at least a portion of the video monitor is in an unobstructed alignment with the image receiving hole to allow the housing to receive the video images from the video monitor to provide the kaleidoscopic effect of the image.

* * * * *